United States Patent Office 3,546,506
Patented Dec. 8, 1970

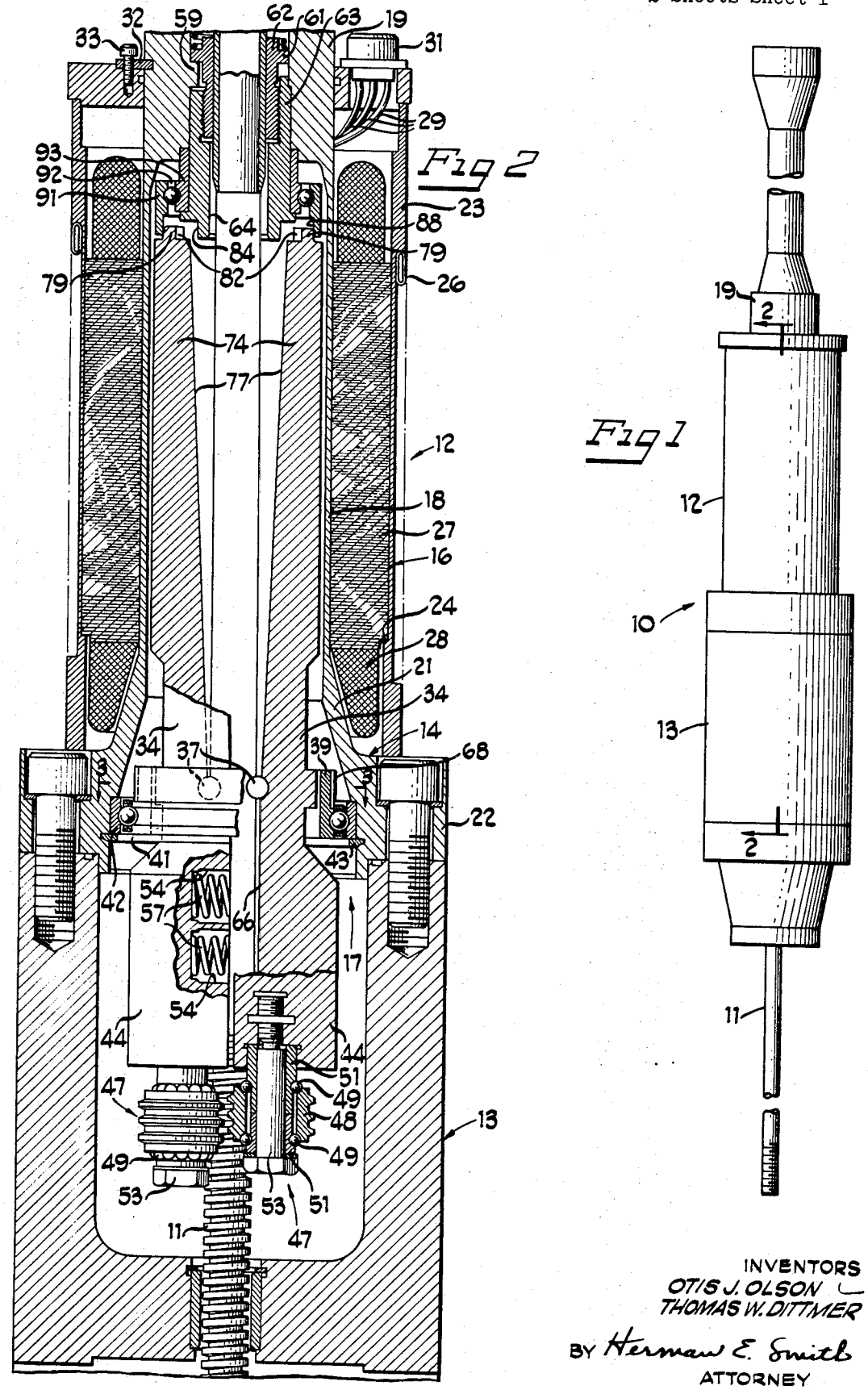
Dec. 8, 1970     O. J. OLSON ET AL     3,546,506
ELECTRIC MOTOR WITH ROTARY-TO-LINEAR MOTION CONVERSION
Original Filed May 22, 1967     2 Sheets-Sheet 1
INVENTORS
OTIS J. OLSON
THOMAS W. DITTMER
BY Herman E. Smith
ATTORNEY

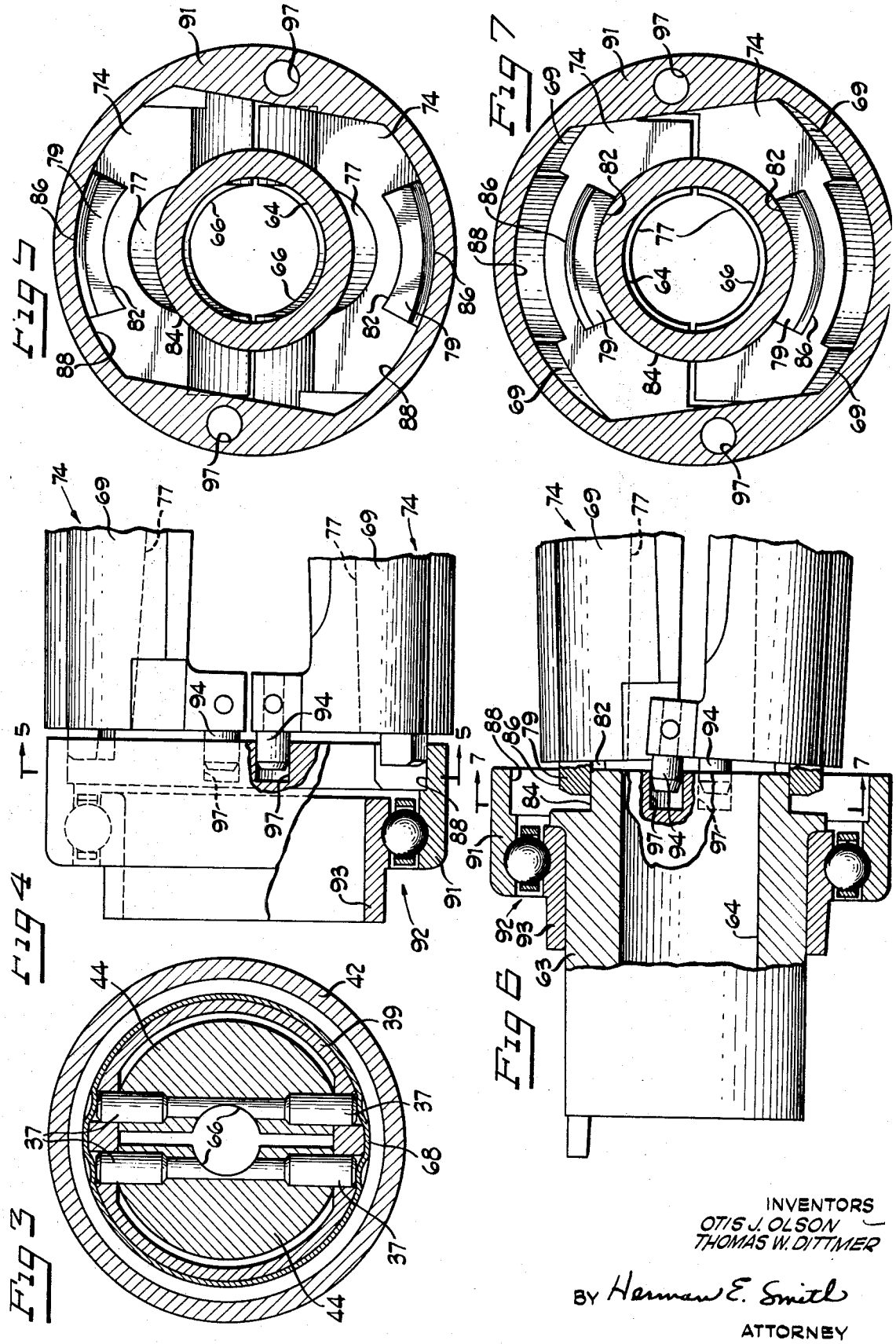

3,546,506
ELECTRIC MOTOR WITH ROTARY-TO-LINEAR MOTION CONVERSION
Otis J. Olson, Decatur, and Thomas W. Dittmer, Macon, Ill., assignors to Borg-Warner Corporation, Chicago, Ill., a corporation of Illinois
Continuation of application Ser. No. 640,230, May 22, 1967. This application Sept. 22, 1969, Ser. No. 860,114
Int. Cl. H02k 7/06
U.S. Cl. 310—83       3 Claims

ABSTRACT OF THE DISCLOSURE

A linear motion device which includes a rotor assembly having pivotal arms operable to engage an expandable roller nut drive with a lead screw. The pivotal arms surround the lead screw and additionally form the rotor pole pieces. The arms are supported for rotation and axial location by a bearing adjacent the fulcrum point. Portions of the rotor arms form the rotor pole pieces. These portions are retained in appropriately spaced relation with respect to the motor stator by a bearing operatively connected to the free ends of the pole piece portions of the rotor arms. Pivotal movement of the arms is synchronized by the bearing associated with the free ends of the arms through a physical connection between a portion of the bearing and the free ends of the arms.

---

This application is a continuation of Ser. No. 640,230, filed May 22, 1967, now abandoned.

SUMMARY OF THE INVENTION

The present invention relates to a linear motion device. More particularly, it relates to linear motion devices including a lead screw driven by an electric motor having a rotor assembly and including pivotal arms operable to effect engagement between an expandable roller nut drive and the lead screw upon motor energization.

Linear motion devices have been constructed which include longitudinally movable lead screws and electric motors having rotors including pivotal arms effective to operate an expandable roller nut drive. Particular applications of such devices include control rod drive mechanisms for nuclear reactors, however, many other applications are possible. With these arrangements, motor energization effects engagement between the lead screw and the expandable roller nut drive and rotor rotation causes longitudinal translation of the lead screw with respect to the roller nut. When the motor is de-energized the rotor arms pivot to disengage the roller nut, and complete separation between the lead screw and roller ball nut is accomplished. This is particularly useful in nuclear applications where a free fall of the control rod and associated lead screw is necessary under emergency or "scram" conditions.

Certain of these devices have included pivotal arms supported by a bearing located near the fulcrum of the arms and a second bearing arrangement associated with the free ends of the portions of the arms forming the rotor pole pieces.

In these structures, certain difficulties have been experienced. One such difficulty relates to operation of the expandable roller nut drive mechanism. Synchronized pivotal movement of the arms and therefore effective disengagement of the roller nut mechanism and the lead screw was not provided. Therefore, in the event of failure of one of the arms to properly pivot to disengage the roller nut mechanism, the lead screw would be retained in its present longitudinal position and would not be free to move with respect to the roller nut drive. This condition created serious problems in nuclear application where the lead screw is required to fall freely during "scram" condition. It was, therefore, necessary to provide an arrangement which could insure disengagement of the roller nut mechanism upon pivotal movement of at least one of the rotor arms.

To accomplish synchronization of the pivotal movement of the rotor arms, certain modifications to the rotor construction were necessary. In this regard a tubular support member was utilized which included a bearing at each end to support it with respect to the motor stator. At the upper end of the tubular portion in association with the free ends of the rotor arms, a second bearing arrangement was provided which through a mechanical connection between a portion of the bearing and the free ends of the arms provided synchronization of the pivotal movement of the arms in the event of movement of at least one of the arms.

This arrangement, however, complicated the rotor structure and required the use of separate bearings at the upper end of the tubular portion to provide for rotational support and synchronization.

Accordingly, the present invention is directed to an improved form of rotor construction which includes a single bearing arrangement associated with the free ends of the arms to provide both support for rotation during motor operation as well as synchronization of the pivotal movement of the arms.

Very generally, the present invention includes a single bearing having an inner and an outer race, one of which is supported by the rotor stator and the other of which is connected by pins to the rotor arms at their free ends. The bearing race associated with the free ends of the arms additionally includes land portions which upon motor energization retain the free ends of the arms in the proper location with respect to the motor stator and support them during rotor rotation. Upon de-energization and pivotal movement of at least one of the rotor arms movement of the associated bearing race is effective and consequent pivotal movement of the other of the rotor arms is accomplished in synchronization thereby assuring complete disengagement of the expandable roller nut mechanism and the lead screw.

BRIEF DESCRIPTION OF THE DRAWING

In the drawings:
FIG. 1 is a view of a linear motion device.
FIG. 2 is a fragmentary section view to enlarged scale of portions of the linear motion device shown in FIG. 1 illustrating the present invention;
FIG. 3 is a transverse section view taken along the line 3—3 of FIG. 2;
FIG. 4 is a fragmentary view to enlarged scale showing portions of the rotor and synchronizing means in an expanded position;
FIG. 5 is a transverse section view taken along the line 5—5 of FIG. 4;
FIG. 6 is a view comparable with FIG. 4 showing portions of the rotor and synchronizing means in a retracted position; and
FIG. 7 is a transverse section view taken along the line 7—7 of FIG. 6.

DESCRIPTION OF THE PREFERRED EMBODIMENT

The reference character 10 indicates a linear motion device including an electric motor section 12, and a drive section 13 providing for axial translation of a lead screw 11. The linear motion device of the illustrated embodiment is particularly suitable for use as a drive mechanism for a nuclear reactor control rod. However, such application should not be considered as a limitation of the scope of the invention. Motor section 12 includes frame member 14, stator assembly 16, and rotor assembly 17.

Enclosed within drive section 13 are roller nut assemblies 47 mounted on the lower ends 44, of rotor arms 34, providing drive means for lead screw 11. Each roller nut assembly 47 includes a roller shell 48 mounted for rotation on balls 49. A pair of inner race members 51 support balls 49 and are mounted on suitable pins 53 secured to rotor lower ends 44. The lower ends 44 of rotor arms 34 include cavities 54 into which are fitted compression springs 57. The lower ends 44 of rotor arms 34 are therefore normally biased apart such as to disengage roller nut assemblies 47 from lead screw 11. As shown in FIG. 2, however, rotor arms 34 are in the engaged position in which springs 57 are compressed allowing roller nut assembly 47 to engage the lead screw 11.

Frame member 14 includes a tubular portion 18 extending between terminal portions 19 and 21. The tubular portion 18 is of a radial thickness which is less than the terminal portions 19 and 21. Portions 18 and 19 are of uniform outside diameter while portion 21 flares outwardly merging into flange portion 22. Frame member 14 is preferably formed from an alloy selected for a suitable combination of strength and magnetic properties. The portion 18 extending through the motor air gap defines a pressure vessel which isolates stator assembly 16 from the fluid which may be present in the shell.

Frame terminal portion 19 flares inwardly including a shoulder portion 59 engaging a collar 61 on the upper portion 62 of sleeve 63. Sleeve 63 is preferably formed of two parts having internal and external threads securing them together. Sleeve 63 includes bore 64 defining the upper portion of a central passage through which lead screw 11 is movable.

A cylindrical shell 23 encloses stator assembly 16 and is provided with a uniform internal diameter terminating in a shoulder 24 for axial location of stator assembly 16. Frame member 14 and shell 23 thus provide an annular pocket for mounting stator assembly 16. Stator assembly 16 is placed in position by endwise sliding movement along frame member 14 until shell 23 engages flange 22 of frame 14. Heat exchanger coils 26 may be provided on shell 23 for conducting heat away from stator assembly 16.

Stator assembly 16 includes stator laminations 27 and field windings 28 which may be constructed and arranged as a four-pole reluctance type motor for operation by means of polyphase current or as a direct current stepping motor. Leads 29 extend from windings 28 to a suitable connector 31 mounted in shell 23. Stator assembly 16 and shell 23 are secured to frame portion 19 by means of keeper 32 and cap screw 33.

Rotor assembly 17 includes a pair of rotor arms 34 pivotally mounted by means of pins 37, in the inner race 39 of ball bearing 41. Outer race 42 of bearing 41 is mounted in flange portion 22 of frame member 14 and secured against axial movement by retaining ring 43. Ball bearing 41 is preferably of the radial-thrust type capable of supporting the weight of rotor assembly 17 and lead screw 11 along its axis of rotation. Pins 37 are secured against endwise movement by a band 68 encircling inner race 39 of bearing 41.

As shown more fully in FIG. 3, lower ends 44 of rotor arms 34 are provided with concave surfaces 66 defining a lower portion of a central passage for lead screw 11 when the rotor arms are in the engaged position of FIG. 2.

Rotor arms 34 include upper end portions 74 having enlargements on the outer surface thereof defining four-pole pieces 69, cooperating with stator assembly 16 to form a motor. Upper rotor arm end portions 74, are provided with concave surfaces 77 angularly intersecting the concave surface 66. The upper concave surfaces 77 define an intermediate portion of a central passage for lead screw 11 when rotor arms 34 are in the deactivated position as shown in FIGS. 6 and 7. As the rotor arms undergo radial movement, the respective concave surfaces approach each other forming a generally cylindrical envelope concentric around lead screw 11. Each rotor arm upper end portion 74 is provided with an upwardly extending tang 79 having an inner arcuate surface 82 adapted to engage the nonrotatable stop surface 84 on sleeve 63 when the rotor arms are in the deactivated position. The engagement of surfaces 82 with stop surface 84 serves to limit inward movement of rotor arm upper end portions 74 to a position defining the generally cylindrical envelope about the axis of rotation of the device. As shown more clearly in FIG. 7, the envelope thus provided is spaced from lead screw 11 defining a portion of an unobstructed passage through which lead screw 11 can be moved.

Each tang 79 also has an outer arcuate surface 86 disposed and arranged to bear against stop surfaces 88 of a freely rotatable member 91, here provided in the form of the outer race of a ball bearing 92 having its inner race 93 mounted on nonrotatable sleeve 63.

Each rotor arm upper end portion 74 is also provided with an upwardly extending pin 94 engaging apertures 97 included within freely rotatable outer race member 91. As shown by comparison of FIGS. 4 and 5 with FIGS. 6 and 7, pins 94 in combination with freely rotatable member 91 provide for concurrently guiding the pivotal movement of arms 34, in synchronism with each other as they move between activated and deactivated positions toward and from the central passage for the lead screw defined in part by the bore 64 and the intersection of the concave surfaces 77, with concave surface 66.

The coaction of rotor assembly 17 with other components of the device can be more readily understood when considered in connection with an operating sequence of the linear motion device. As shown in FIG. 2, the device has been conditioned for operation by supplying electric current of zero frequency to stator assembly 16. Upper end portions 74 of rotor arms 34 are thus magnetically attracted outwardly until tangs 79 and stop surfaces 88, establish the desirer location of pole pieces 69, with respect to the field windings 28 of stator assembly 16. As upper arm portions 74 move outwardly, lower arm end portions 44 move inwardly engaging roller nut assemblies 47 with the threads of lead screw 11. Where a reluctance type motor is employed, rotor assembly 17 rotates about the axis of rotation of the device in accordance with the frequency of the current imparting linear motion to lead screw 11 by means of roller shell 48. Reversal of the direction of motion of lead screw 11 is accomplished by reversing the direction of rotation of rotor assembly 17 which, in turn, is accomplished by reversing the phase relationship of the current supplied to stator assembly 16. Rotor assembly 17 will remain in activated position without undergoing rotation in either direction so long as current of zero frequency is supplied to field windings 28. In this activated but nonrotating position, roller nut assemblies 47 hold lead screw 11 in axial position preventing translation thereof under the influence of external forces. Where a direct current stepping motor is employed, rotor assembly 17 is rotated by sequential energization of portions of field winding 28, the operation of the rotor arms being substantially as described above.

In order to provide for emergency "fail safe" operation, the device is constructed and arranged to drop lead screw 11 to a preselected "safe" position when current is absent from field windings 28. The lead screw 11 may be urged to this "safe" position by gravity or spring bias or a combination of the two. When current is absent from the field windings 28, springs 57 force the lower end portions 44 of rotor arms 34 apart causing upper end portions 74 thereof to move inwardly, the field coils no longer exerting magnetic attraction on the rotor arms.

Freely rotatable member 91 guides the arms in synchronism with each other such that like parts of each rotor arm are equidistant from the axis of rotation of the device at any given time. Thus when power is removed from the device, roller nut assemblies 47 move outwardly in unison allowing lead screw 11 to drop through the central passageway unobstructed by interference with roller shells 48. The synchronizing function assures that the total movement of the drive device is equally divided in opposite directions from the axis of rotation. This avoids interference between portions of roller shell 48 and the threads of lead screw 11 arising from undertravel by one of the arms.

While a preferred form of the invention has been shown and described, it is to be understood that other modifications and variations thereof are included within the spirit of the invention and scope of the following claims.

What is claimed is:

1. A linear motion device including an electric motor having a frame, a stator assembly, a rotor assembly, and a lead screw arranged concentrically with respect to an axis of rotation, said frame having mounted therein first and second bearings spaced axially along said axis of rotation and supporting said rotor assembly for rotation with respect to said frame, said first bearing being mounted in a non-rotatable sleeve extending from said frame and including rotatable stop means, said assembly including a plurality of elongated rotor arms each rotor arm defining a motor pole piece adjacent one end portion thereof including an abutment, and having drive means engageable with said lead screw adjacent the opposite end portion thereof, said end portions being alternately movable radially toward and from said axis of rotation, said abutment being engageable with said sleeve for limiting movement toward said axis and being engageable with said stop means for limiting movement from said axis, each of said rotor arms being pivotally supported adjacent said one end portion thereof in said first bearing having a first pivotal connection therewith offset from and parallel to said axis of rotation, each of said rotor arms being pivotally supported intermediate its end portions in said second bearing having a second pivotal connection therewith extending transversely with respect to said axis of rotation, said first bearing in combination with said first pivotal connections of said plurality of rotor arms providing means for synchronizing the radial movement of said plurality of rotor arms while supporting said rotor assembly for rotation about said axis of rotation.

2. The structure according to claim 1 in which said first bearing includes a non-rotatable inner race member mounted on said sleeve, and an outer rotatable race member including a said first pivotal connection for each of said rotor arms and defining a common stop means engageable with said rotor arm abutments.

3. The structure according to claim 2 in which each of said rotor arm upper end portions includes a longitudinally extending pin pivotally received within said outer rotatable race member defining said first pivotal connection.

References Cited

UNITED STATES PATENTS 2,812,455  11/1957  Noe _____ 310—83

DONOVAN F. DUGGAN, Primary Examiner

UNITED STATES PATENT OFFICE
CERTIFICATE OF CORRECTION

Patent No. 3,546,506                                                   December 8, 1970

Otis J. Olson et al.

It is certified that error appears in the above identified patent and that said Letters Patent are hereby corrected as shown below:

Column 5, line 27, before "assembly" insert -- rotor --.

Signed and sealed this 30th day of March 1971.

(SEAL)
Attest:

EDWARD M. FLETCHER, JR.                           WILLIAM E. SCHUYLER,
Attesting Officer                                       Commissioner of Pate